(12) United States Patent
West et al.

(10) Patent No.: US 7,832,697 B2
(45) Date of Patent: Nov. 16, 2010

(54) WALL MOUNTED APPLIANCE HOLDER

(76) Inventors: Jennifer Lynn West, 1428 11th St., Santa Monica, CA (US) 90401; Gary James Sanati, 22919 Madison St., Torrance, CA (US) 90505

( * ) Notice: Subject to any disclaimer, the term of this patent is extended or adjusted under 35 U.S.C. 154(b) by 724 days.

(21) Appl. No.: 11/697,402

(22) Filed: Apr. 6, 2007

(65) Prior Publication Data

US 2007/0290110 A1  Dec. 20, 2007

Related U.S. Application Data

(60) Provisional application No. 60/805,170, filed on Jun. 19, 2006.

(51) Int. Cl.
*E04G 3/00* (2006.01)
(52) U.S. Cl. ............... 248/276.1; 248/181.1; 248/176.1
(58) Field of Classification Search ............. 248/309.1, 248/176.1, 181.1, 181.2; 211/13.1, 70.6, 211/86.01, 87.01; D6/567; 403/122, 124, 403/126, 142, 143
See application file for complete search history.

(56) References Cited

U.S. PATENT DOCUMENTS

| | | | |
|---|---|---|---|
| 2,950,836 A * | 8/1960 | Murdock | 220/576 |
| 4,225,106 A | 9/1980 | Eplan | |
| 4,453,695 A * | 6/1984 | Sennott et al. | 248/660 |
| 4,461,439 A * | 7/1984 | Rose | 248/51 |
| 4,647,434 A * | 3/1987 | Ayers et al. | 422/144 |
| 4,673,148 A | 6/1987 | Oliver | |
| 4,696,447 A | 9/1987 | Strecker | |
| 4,712,313 A * | 12/1987 | Gettleman | 34/97 |
| 4,746,090 A | 5/1988 | Hamilton | |
| D342,343 S | 12/1993 | Slivko | |
| 5,761,825 A | 6/1998 | Ammon | |
| 5,956,861 A | 9/1999 | Barnes | |
| 6,061,923 A | 5/2000 | Case | |
| 6,189,229 B1 | 2/2001 | Thomas | |
| D456,657 S | 5/2002 | Mar | |
| 6,457,686 B1 | 10/2002 | Hill | |
| 6,520,467 B2 | 2/2003 | Thomas | |
| 7,100,881 B2 * | 9/2006 | Worrall | 248/278.1 |

* cited by examiner

*Primary Examiner*—Gwendolyn Baxter
(74) *Attorney, Agent, or Firm*—George R. Reardon

(57) ABSTRACT

A wall mounted holder for an appliance is disclosed. The holder is capable of supporting a variety of conventional hair dryers and permitting the flow of air to be directed in any desired direction while leaving the user's hands free for other purposes.

11 Claims, 18 Drawing Sheets

US 7,832,697 B2

WALL MOUNTED APPLIANCE HOLDER

This application claims priority to provisional application 60/805,170, dated Jun. 19, 2006, which is incorporated herein in its entirety.

FIELD OF THE INVENTION

The present invention relates to the field of accessories for wall mounted holders of appliances, and more particularly to a hair dryer mount capable of supporting a variety of conventional hair dryers and permitting the flow of air to be directed in any desired direction while leaving the user's hands free for other purposes.

BACKGROUND OF THE INVENTION

Portable hand-held electric blow dryers are widely used devices for drying and styling the hair of users. Such a hair dryer typically includes a heating element, a fan, and means to direct hot air toward the head of a user. Such hair dryers generally have an elongated graspable handle section and a barrel section extending generally perpendicularly with respect to one another from a central section. The user holds the hair dryer by the handle and directs the barrel toward the damp hair so that the warm air impinges on it.

This mode of operation presents several drawbacks. For example, the user's arm may become tired after holding the drier up for a sustained period of time, notwithstanding the fact that commercially available driers are relatively lightweight. Moreover, since the user has to hold the blow drier in one hand adjacent his or her head, this severely limits the user's ability to style his or her hair during the drying operation. Many hair styles require the use of both hands to hold the hair in proper position while it is being combed and brushed so that the desired styling can be achieved. Additionally, it is difficult for a person who does not have full use of his or her arms because of some disability to fully use the conventional blow dryer.

The use of stands and wall mounting devices for blow dryers are known in the art. More specifically, hair drying stands and wall mounted devices heretofore devised and utilized for the purpose of drying hair are known to consist basically of familiar, expected and obvious structural configurations, notwithstanding the myriad of designs encompassed by the crowded prior art which have been developed for the fulfillment of countless objectives and requirements.

Some of the known holders, once the hand-held blow dryer has been fitted therein, do not allow for convenient adjustment of the height and directivity of the barrel. Some of the known holders do allow for adjustment of the height and directivity of the barrel but are difficult to assemble, complicated to use and/or costly to manufacture. Some of the known holders have too much gadgetry, e.g. wing nuts, using unhinging and repositioning of the device in order to obtain different air flow positions. Some of the known holders sit on a table top or counter, taking up valuable space, adding to clutter. Another problem with table top holders is that they do not allow the user to stand and optimally use the bathroom mirror. Some of the known holders use a goose-neck design, which allows a blow dryer to fall should the goose-neck succumb to gravity.

Additionally, some users wishing to save time prefer the option of multi-tasking, e.g. brushing teeth, applying make-up, while a steady stream of well directed air removes excess moisture from the hair, prior to styling the finishing touches. Other problems exist.

Known art related to hair dryer stands for hands free drying of hair includes D253,305, U.S. Pat. Nos. 4,874,142, 5,064,154, 5,172,880, 5,174,531, 5,350,144, 5,636,815, 5,737,847, 5,832,624, 5,842,670, 5,937,537, 5,956,862, 5,970,622, D417,751, U.S. Pat. Nos. 6,199,805, 6,390,424, 6,491,267, and D489,841.

Known art related to wall mounted holders for hair dryers includes the following.

U.S. Pat. No. 4,225,106, issued to Eplan on Sep. 30, 1980, discloses an apparatus for supporting an electrical hair drier or other hand-held electrical device having a hand grip portion and a barrel portion extending therefrom. The apparatus includes a bracket on which an arm is pivotably secured. A holder, having an elongated slot, is pivotably secured on the end of the arm. The holder includes a yoke at its free end. The drier is supported in the holder with its hand grip portion in the slot and its barrel portion supported in the yoke. Resilient straps are provided to releasably secure the device in place. The bracket is arranged to be secured to a support wall or other member.

U.S. Pat. No. 4,453,695, issued to Sennott et al. on Jun. 12, 1984, discloses a hair dryer mount for suspending a conventional hair dryer and permitting the flow of air to be directed in a desired direction while leaving the user's hands free. The hair dryer mount includes a wall bracket, extension arms and a support which includes a strap which fits around the hair dryer and holds the hair dryer in a nest. The nest is connected through a trunnion and yolk to the end of an extension arm to provide a wrist type joint. The extension arms and the support are connected together with adjustable friction couplings to provide sufficient friction among the parts so that the assembled mount may hold the hair dryer suspended about the user's head. The hair dryer may be moved from one position to another without adjustment of the mount.

U.S. Pat. No. 4,461,439, issued to Rose on Jul. 24, 1984, discloses a two-part holder for an appliance, such as a manually operable hairdryer, includes a stationary wall mounted bracket as one part and a relatively movable appliance clamping portion as the other part. The clamping portion may be clamped about an appliance and quickly connected to and quickly removed from the stationary bracket without manipulating any fastening mechanism. An abutment projecting from the bracket retains the electric supply cord of an appliance out of the user's way.

U.S. Pat. No. 4,673,148, issued to Oliver on Jun. 16, 1987, discloses a holder device adapted to be affixed to a vertical wall accommodates an electric hair dryer having an elongated barrel and permits easy insertion of the dryer into and removal from the holder. The holder has a mounting bracket and an arm pivotably engaged by the bracket and adapted to be easily moved between a vertically pendant position and a horizontally disposed position. When the arm is in its horizontal position with the dryer engaged therein, the dryer may be utilized in a hands-free mode.

U.S. Pat. No. 4,696,447, issued to Strecker on Sep. 29, 1987, discloses a blow dryer holding device where the handle portion of a hair dryer is seated within a retainer and held positioned therein by abutment with a curved backstop depending from the retainer. The retainer and backstop are rigidified by a rib interfitted with and pivotally connected to a rigid projection from a base in alignment with a vertical pivot plane. The base is attached to a vertical support surface by at least two suction cups equally spaced from the pivot plane above the horizontal pivot axis about which the retainer is angularly adjusted to a desired oriented position.

U.S. Pat. No. 4,712,313, issued to Gettleman on Dec. 15, 1987, discloses a hands free portable hair dryer holder designed to hold a portable hair dryer while in use, allowing a person to use their two free hands on the hair. A mechanism can be built within the holder which will automatically swing the hair dryer up and down while in use so as to prevent excessive heat at one spot on the hair.

U.S. Pat. No. 4,746,090, issued to Hamilton on May 24, 1988, discloses an adjustable holder device for a hand held hair dryer allows rotational and vertical movement of the hair dryer according to the needs of the user. The device comprises a holder member having an open-sided receiving hole in one extremity dimensioned to receive a handle of a hair dryer and attachment means on another extremity. A wall mount base is also provided which is capable of being permanently attached to a wall with complimentary means for receiving the attachment means of the holder member in varying vertical positions.

U.S. Pat. No. D342,343, issued to Slivko on Dec. 14, 1993, illustrates a support for a hand held hair dryer or styling implement.

U.S. Pat. No. 5,761,825, issued to Ammon et al. on Jun. 9, 1998, discloses a hands free hair dryer and holder comprising a portable hair dryer. A structure is for supporting the portable hair dryer in a stationary adjustable manner, so that a person can position the portable hair dryer towards the hair, so that both hands are free to do other things while drying the hair.

U.S. Pat. No. 5,956,861, issued to Barnes on Sep. 28, 1999, discloses a wall mounted portable hair dryer holder which takes the form of a wall mounted bracket from which pivotly extends a flexible walled tube with the outer end of the tube being connected to a base ring. The main body section of the hair dryer, which is the fan and heater housing of the hair dryer, is to be fixedly secured to a mounting ring with this mounting ring being then pivotly mounted onto the base ring. The handle of the hair dryer is to be insertable through an enlarged center through hole between the base ring and the mounting ring. The result is the hair dryer can be moved practically to any desired position permitted by the flexible walled tube and then adjusted to any specific position by pivoting of the mounting ring relative to the base ring and also pivoting of the base ring relative to the flexible walled tube.

U.S. Pat. No. 6,061,923, issued to Case on May 16, 2000, discloses a hair dryer holder for holding a hair dryer so that a user's hands are free to perform other acts. The hair dryer holder includes a base and a generally U-shaped holding bracket adapted for holding a hair dryer. An adjustably extendable extension member connects the base to the holding bracket. The extension member has an extended position and a retracted position. The holding bracket and the base is positioned closer together when the extension member is positioned in the retracted position than when the extension member is positioned in the extended position.

U.S. Pat. No. 6,189,229, issued to Thomas et al. on Feb. 20, 2001, discloses a hair dryer holder for adjustably holding a hair dryer, comprising a base for attaching the hair dryer holder to a surface, an extension member including a bottom portion fixed to the base and an arm member extending from the base, and a universal joint member coupled to the arm member and comprising a ball member juxtaposed between two cup members for rotation therein, the ball member configured for coupling to a nozzle of a hair dryer such that the nozzle can be positioned by the ball member.

U.S. Pat. No. D456,657 S, issued to Mar on May 7, 2002, illustrates a wall mounted, hands free blow dryer holder.

U.S. Pat. No. 6,457,686 B1, issued to Hill on Oct. 1, 2002, discloses a handheld dryer support device for supporting a handheld electric dryer at various angles without the user having to use one's hands. The handheld dryer support device includes a base member being adapted to be securely mounted to a structure; and also includes an arm assembly being pivotally mounted to the base member and including a plurality of elongate tubular members; and further includes a dryer support member being removably and securely attached to the arm assembly for supporting a handheld dryer.

U.S. Pat. No. 6,520,467 B2, issued to Thomas et al. on Feb. 18, 2003, discloses a hair dryer holder for adjustably holding a hair dryer, comprising a base for attaching the hair dryer holder to a surface; an extension member including a bottom portion fixed to the base and an arm member extending from the base; and a cup member coupled to the arm member. The holder also includes a ball member disposed between the cup member and a plate member for rotation therein, the ball member is configured for coupling to a nozzle of a hair dryer such that the nozzle can be positioned by the ball member.

While these devices fulfill their respective, particular objectives and requirements, the aforementioned patents do not disclose a new wall mounted appliance holder. The inventive device includes a base member being adapted to be securely mounted to a structure, e.g. a wall, includes an arm assembly being pivotally mounted to the base member, and further includes an appliance holding member for supporting a handheld dryer, where the appliance holding member is pivotally attached to the arm assembly.

In these respects, the wall mounted appliance holder according to the present invention substantially departs from the conventional concepts and designs of the prior art, and in so doing provides an apparatus primarily developed for the purpose of supporting a handheld electric dryer at various angles without the user having to use one's hands. While these devices fulfill their respective, particular objectives and requirements, the aforementioned patents do not utilize or disclose a wall mounted appliance holder utilizing an elbow-forearm-wrist-hand type of arrangement. This motion will be described in more detail herein.

One problem with U.S. Pat. No. 6,457,686, issued to Hill, is that it includes an arm assembly comprising a plurality of telescopic elongate tubular members which adds to the cost and complexity of the device, as well as adding to the instability of the device.

One problem with U.S. Pat. No. 4,453,695, issued to Sennott et al., is that is includes a pair of arms, with a first arm attached to a wall mount on one end and hingeably attached to a second arm on the other end, where the second arm is attached to a hair dryer holder. Not only does this arrangement add to the cost and complexity of the device, it also makes it difficult to hold a hair dryer in a stable position.

There is a need for a wall mounted appliance holder that is more stable and has less cost and complexity.

There is also a need for a wall mounted appliance holder that is more flexible in its use.

There is a need for a wall mounted appliance holder that is able to accommodate a variety of different kinds of blow dryers and which can suspend the blow dryer in any position relative to the user's head.

There is a need for a wall mounted appliance holder where the position of the blow dryer and the direction of the air flow may be easily changed from one position to another without having to disengage the support mechanism, move the blow dryer and then re-engage the mechanism.

There is a need for a wall mounted appliance holder that can be pushed from one position to another without need of adjusting the wall mounted appliance holder and which will stay in the desired position without further adjustment once it is put in place.

Therefore, a need exists for a wall mounted appliance holder with these attributes and functionalities. The wall mounted appliance holder according to embodiments of the invention substantially departs from the conventional concepts and designs of the prior art. It can be appreciated that there exists a continuing need for a new and improved wall mounted appliance holder which can be used commercially. In this regard, the present invention substantially fulfills these objectives.

The foregoing patent and other information reflect the state of the art of which the inventors are aware and are tendered with a view toward discharging the inventor's acknowledged duty of candor in disclosing information that may be pertinent to the patentability of the present invention. It is respectfully stipulated, however, that the foregoing patent and other information do not teach or render obvious, singly or when considered in combination, the inventor's claimed invention.

BRIEF SUMMARY OF THE INVENTION

The general purpose of the present invention, which will be described subsequently in greater detail, is to provide a wall mounted appliance holder. In particular, the present invention relates to a device that utilizes the principles of an elbow, forearm, wrist, and hand arrangement for adjustable support of a blow dryer. Generally speaking, the present invention permits hands-free drying of the user's hair, thus leaving both hands free of a user during the blow drying process to facilitate the styling of hair, the brushing of teeth, the applying of makeup, and the like.

The present invention also provides an aesthetically pleasing resting position for a blow dryer when it is not in use, saving the user from having to store and retrieve the blow dryer in order to have a neat looking bathroom. The present invention also alleviates the drama of having a running blow dryer placed on a counter top while the user struggles to section her hair and properly position the brush when styling for smoothness.

The present invention uses a combination of pivot members, e.g. press fit ball joints and spring steel snap rings, in order to facilitate ease of use and effectiveness. The ball joints make it easy to maneuver the air flow into a desired position with minimal effort. The spring steel snap rings keep enough tension of the ball joints to make the present invention's use lasting and strong. Additionally, a universal holder positioned at the top of a shaft and having gaskets, e.g. rubber gaskets, to assure a snug form fit, allows for practically any model blow dryer to be securely held in place while simultaneously allowing the user to grasp and remove and replace the blow dryer as needed.

In one embodiment the present invention may be made and assembled in the following steps:
  Create a rounded base from plastic dimensioned to be fixed to a wall with fasteners, e.g. concrete screws
  Form a round holder on the rounded base with cut out edges elevated from the round holder extending upward at approximately 90 degrees
  Form a shaft having a lower ball and an upper ball
  Place the lower ball of the shaft in the round holder
  Secure the lower ball of the shaft with a spring steel snap ring around the cut out edges
  Take a holder, e.g. a U-shaped holder, with a rounded out hollow base with cut out edges and place the U-shaped holder over the upper ball
  Secure the U-shaped holder to the upper ball with a spring steel snap ring around the cut out edges of the U-shaped holder
  Form U-shaped gaskets dimensioned to fit on the U-shaped holder and having sufficient friction holding characteristics to snugly hold a blow dryer in place.
  Press the rubber gaskets onto the U-shaped holder
  Check the tension and holding power of the assembly In one embodiment the wall mounted appliance holder is comprised of means for attachment to a substantially vertical surface, e.g. a wall, means for elbow element pivoting, a means for wrist element pivoting, means for hand element grasping and a forearm element that cooperates with the means for elbow element pivoting, the means for wrist element pivoting and the means for hand element grasping.

In one embodiment, the present invention is comprised of a base mount held stable to a surface, e.g. a wall, with fasteners, e.g., screws, bolts, adhesives, magnets, hook and loop fasteners. The present invention is further comprised of a cup assembly connected to the base mount. The present invention is further comprised of a base-mount ball joint operable to cooperatively engage within the cup assembly. The present invention is further comprised of an arm shaft connected at the lower end of the arm shaft to the base-mount ball joint and held tight with a spring steel snap ring. The present invention is further comprised of a generally U-shaped universal holder dimensioned to hold a handle of a blow dryer. The universal holder cooperates with the arm shaft via a wrist-mount ball joint positioned and secured at the upper end of the arm shaft. The wrist-mount ball joint is held tight with a spring steel snap ring. The present invention is further comprised of a plurality of rubber gaskets disposed on the universal holder to securely hold a blow dryer handle. Rubber gaskets of various dimensions may be used in order to accommodate blow dryer handles of different dimensions.

In some embodiments of the present invention the arm shaft and ball joints may be formed as one piece. In other embodiments of the present invention the arm shaft and ball joints may be formed as separate pieces and dimensioned such that the ball joints may be affixed to the arm shaft.

The present invention pivots and positions in a manner that mimics the operation of a human elbow, forearm, wrist, and hand. A forearm-like arrangement cooperates both with an elbow-like arrangement and a wrist-hand-like arrangement to accomplish this simulation.

In one embodiment the elbow arrangement mounts to a wall using fasteners, e.g. concrete screws; this arrangement provides a first cup assembly, i.e. a socket, for a shaft, i.e. a forearm, which is held securely in place by one or more snap rings, i.e., a spring steel snap ring. The shaft extends upward to second cup assembly, i.e. a wrist, which is also secured with an additional snap ring. The ability of the present invention to grasp a particular blow dryer is augmented by rubber gaskets which fit securely over the top of a U-shaped universal holder, i.e. mimicking a hand with fingers.

The present invention is preferably made from a plastic such as polyurethane with a hardening substance such as glass or POM plastic to achieve the desired characteristics. The present invention may be made from other materials, e.g. brass, polished nickel, in order to provide an array of finishes to match the decor of a particular bathroom. The present invention may be constructed with a different mechanical approach than what is shown in the attached drawings.

One aspect of the present invention to provide a new wall mounted appliance holder which has many of the advantages of the dryer support devices mentioned heretofore and many novel features that result in a new wall mounted appliance holder which is not anticipated, rendered obvious, suggested, or even implied by any of the prior art dryer support devices, either alone or in any combination thereof.

Another aspect of the present invention is that is provides a wall mounted appliance holder which is more flexible in its use.

Another aspect of the present invention is that it provides a hands free wall mounted appliance holder which is easy to install.

Another aspect of the present invention is that it provides a hands free wall mounted appliance holder which is simple and easy to use.

Another aspect of the present invention is that it provides an apparatus for supporting and holding commercially available blow dryers in a multitude of positions adjacent to the user's head to free the user's hands for other purposes.

Another aspect of the present invention is that it provides an apparatus for adjustably supporting commercially available hand-held blow dryers.

Another aspect of the present invention to provide a new wall mounted appliance holder which may be easily and efficiently manufactured and marketed.

Another aspect of the present invention to provide a new wall mounted appliance holder which is of a durable and reliable construction.

Another aspect of the present invention is to provide a new wall mounted appliance holder which is susceptible of a low cost of manufacture with regard to both materials and labor, and which accordingly is then susceptible of low prices of sale to the consuming public, thereby making such handheld dryer support device economically available to the buying public.

Another aspect of the present invention is to provide a new wall mounted appliance holder which provides in the apparatuses and methods of the prior art some of the advantages thereof, while simultaneously overcoming some of the disadvantages normally associated therewith.

Another aspect of the present invention is that it may be made from readily available materials.

These and other features and advantages of the present invention will be presented in more detail in the following specification of the invention and the accompanying figures, which illustrate by way of example the principles of the invention.

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE SEVERAL VIEWS OF THE DRAWINGS

The invention, together with further advantages thereof, may best be understood by reference to the following description taken in conjunction with the accompanying drawings in which.

DETAILED DESCRIPTION OF THE INVENTION

Figure 1:
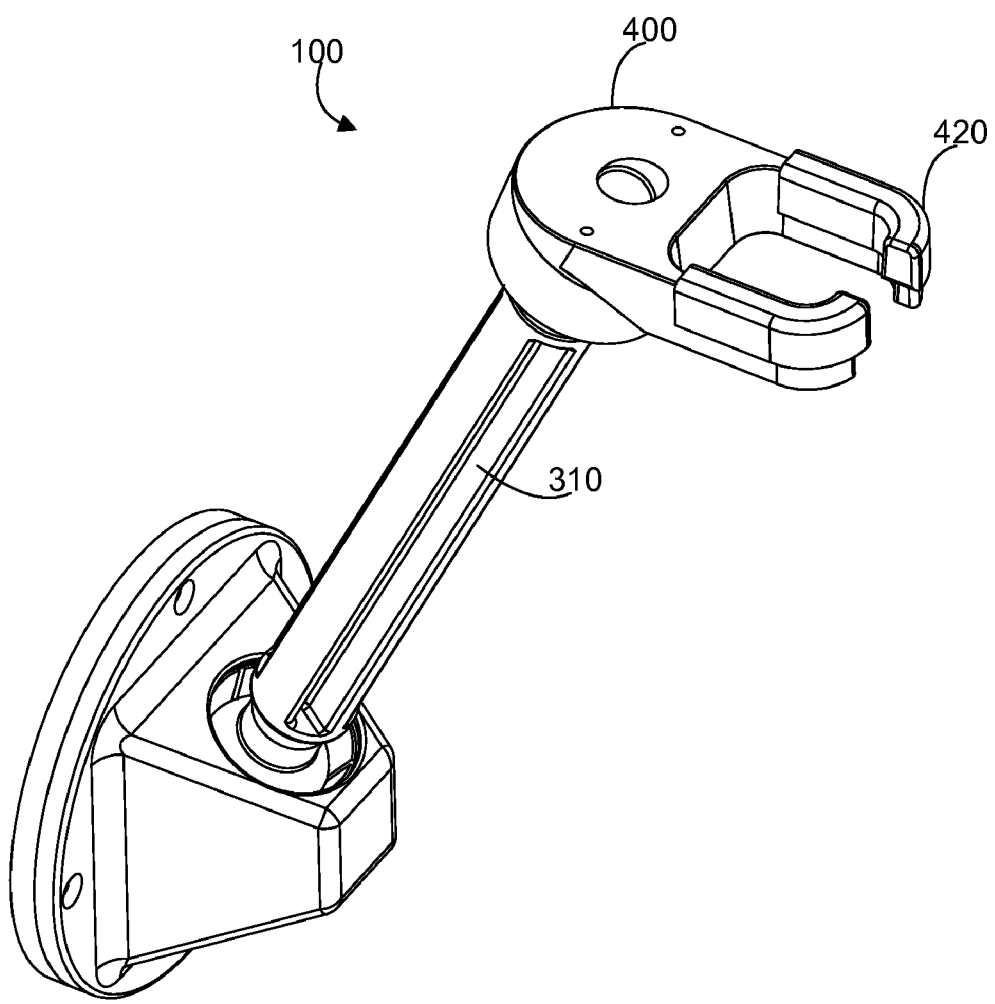
FIG. 1 illustrates a perspective view of a wall mounted blow dryer holder, according to an embodiment of the present invention.
Figure 2:
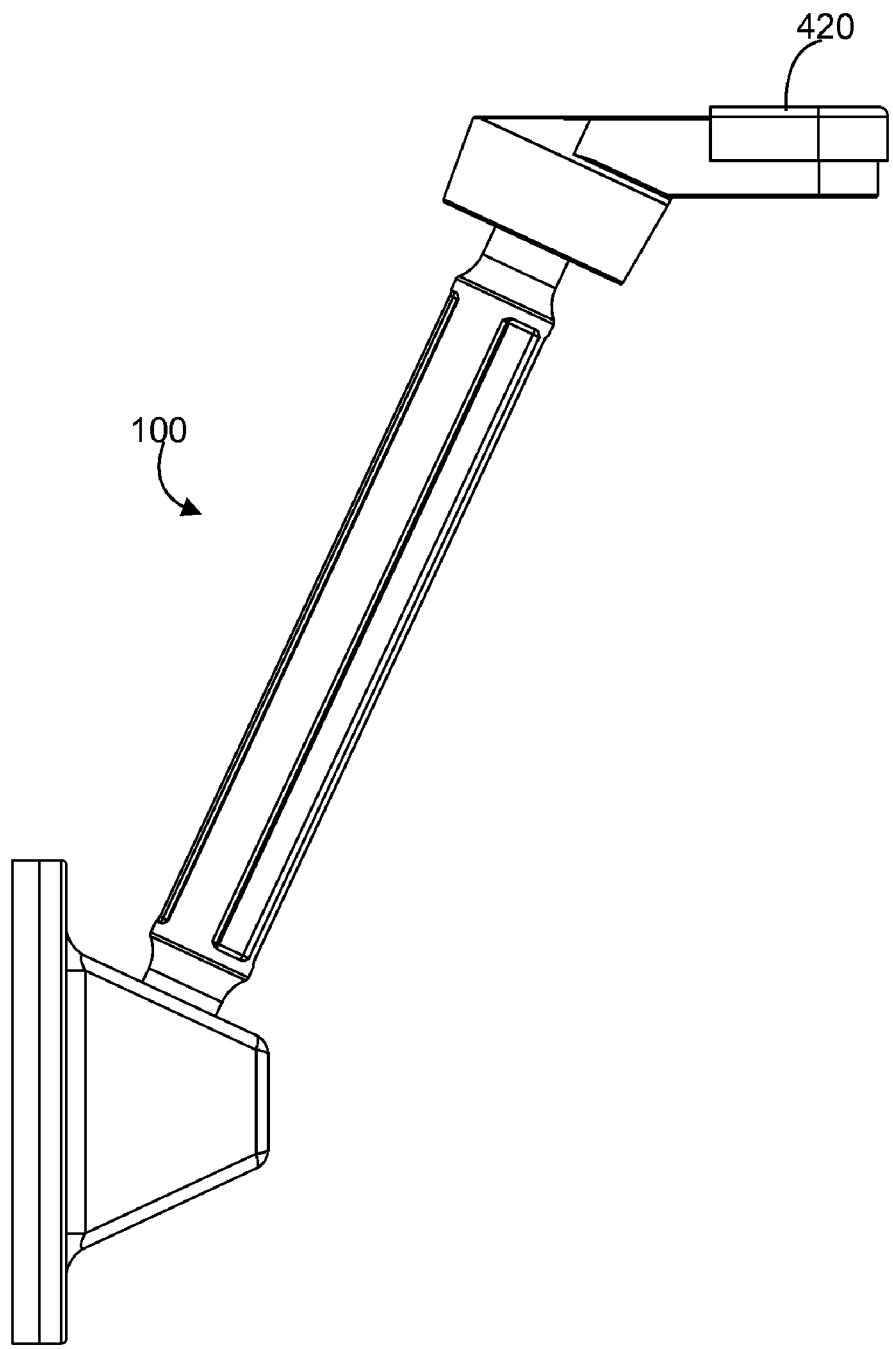
FIG. 2 illustrates a right side plan view of a wall mounted blow dryer holder, according to an embodiment of the present invention.
Figure 3:
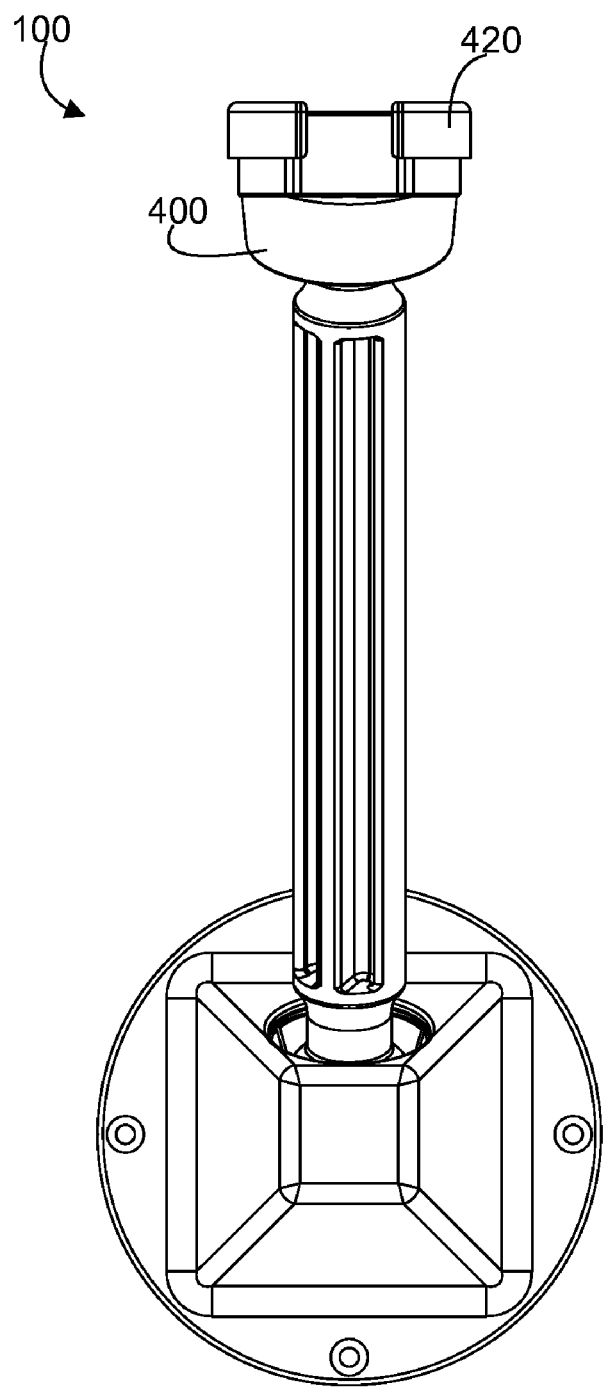
FIG. 3 illustrates a front plan view of a wall mounted blow dryer holder, according to an embodiment of the present invention.
Figure 4:
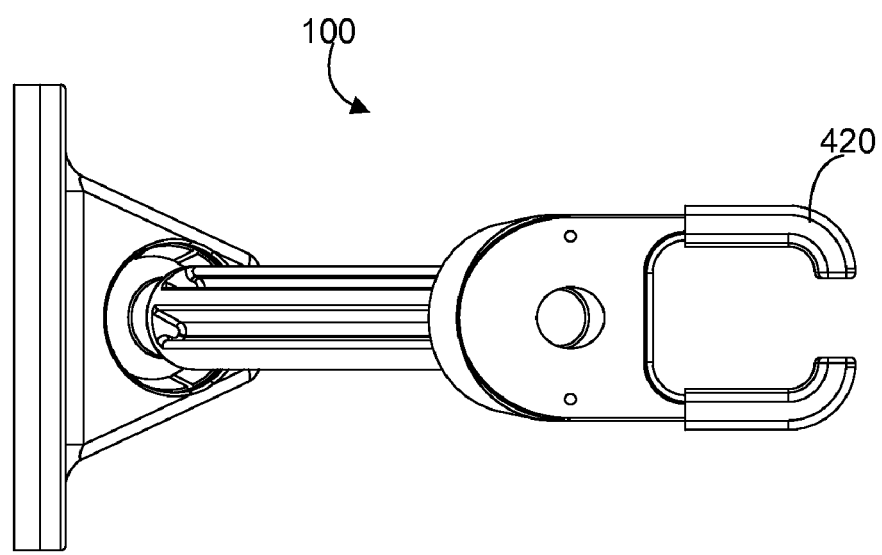
FIG. 4 illustrates a top plan view of a wall mounted blow dryer holder, according to an embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

Referring now to FIG. 1 through FIG. 20 in one embodiment, a wall mounted appliance holder 100 is comprised of a wall mount assembly 200, a shaft assembly 300, and an appliance holder assembly 400. The appliance holder assembly 400 is dimensioned for the snug holding of a conventional hand held blow dryer. The shaft assembly 300 cooperates pivotally with the wall mount assembly 200 and the appliance holder assembly 400 to facilitate the positioning of the snuggly held blow dryer to the angle desired by a user.

The shaft assembly is further comprised of a shaft element 310 having a bottom ball joint 320 at the near end of the shaft element 310 and a top ball joint 330 at the distal end of the shaft element 310. The shaft assembly is further comprised of a plurality of snap ring 340.

Figure 5A:
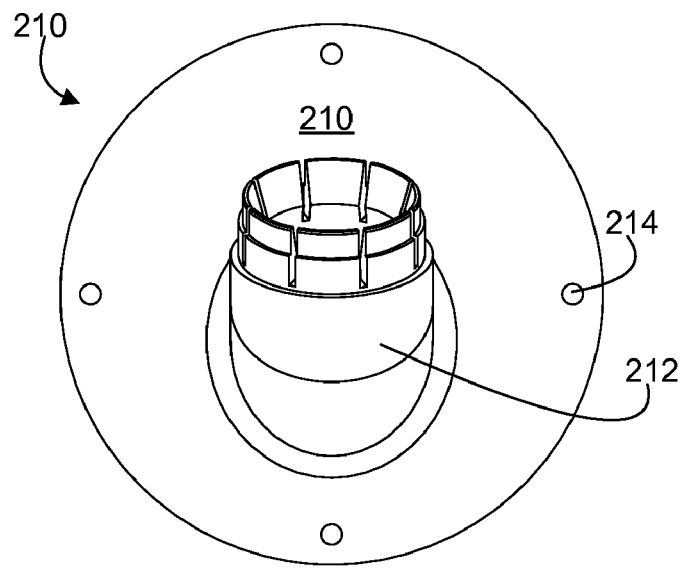
FIG. 5A illustrates a front plan view of a wall mount interior assembly, according to an embodiment of the present invention.
Figure 5B:
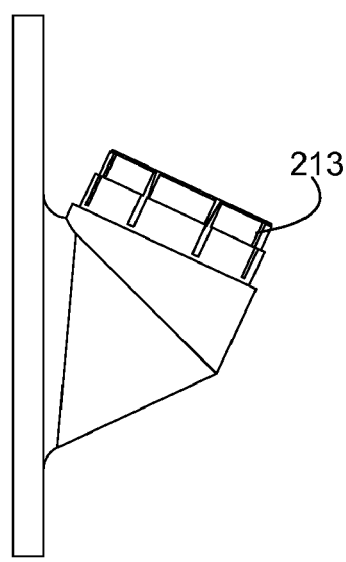
FIG. 5B illustrates a left side plan view of a wall mount interior assembly, according to an embodiment of the present invention.
Figure 6A:
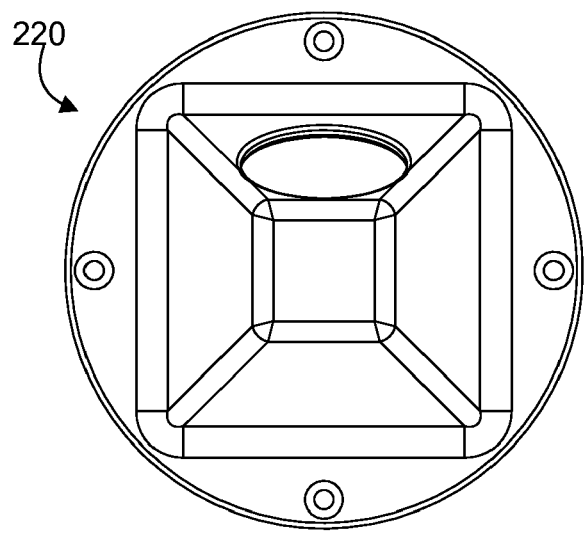
FIG. 6A illustrates a front plan view of a wall mount exterior assembly, according to an embodiment of the present invention.
Figure 6B:
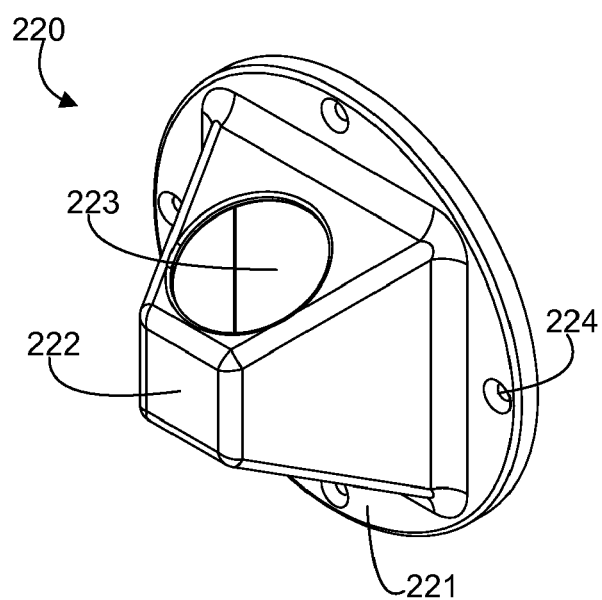
FIG. 6B illustrates a perspective view of FIG. 6A.
Figure 7A:
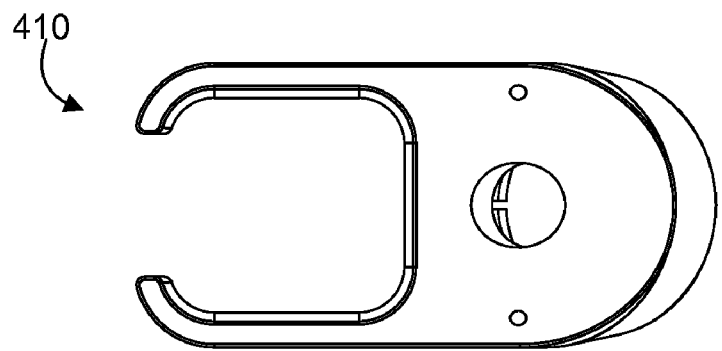
FIG. 7A illustrates a top plan view of a U-shaped holder, according to an embodiment of the present invention.
Figure 7B:
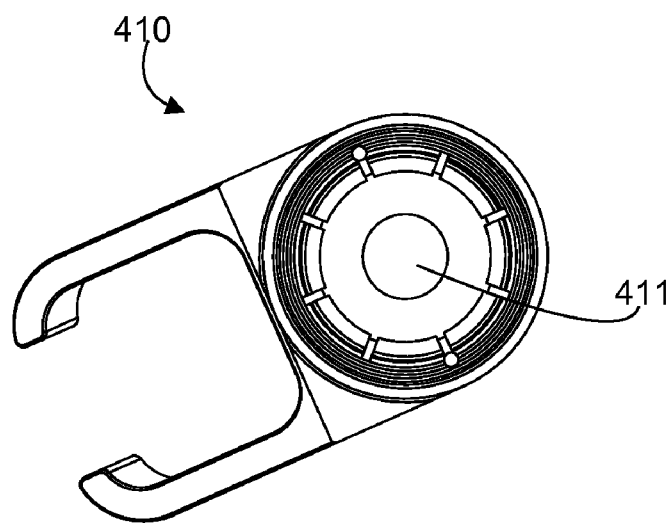
FIG. 7B illustrates a bottom plan view of a U-shaped holder, according to an embodiment of the present invention.
Figure 8:
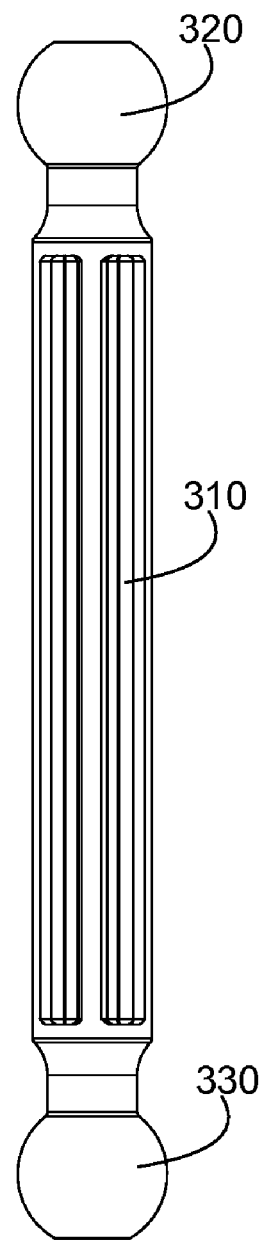
FIG. 8 illustrates a front plan view of a shaft, according to an embodiment of the present invention.
Figure 9:
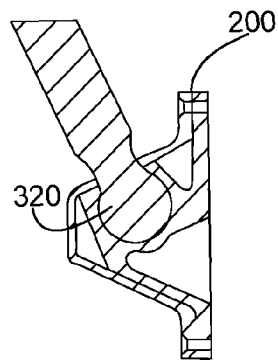
FIG. 9 illustrates a left side sectional plan view of a wall mount assembly with the lower ball joint of a shaft inserted, according to an embodiment of the present invention.
Figure 10:
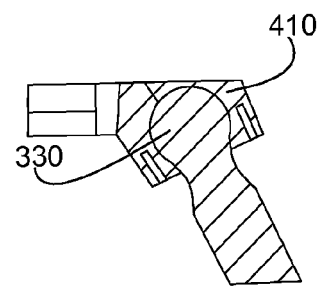
FIG. 10 illustrates a right side sectional plan view of a U-shaped holder with the upper ball joint of a shaft inserted, according to an embodiment of the present invention.
Figure 11:
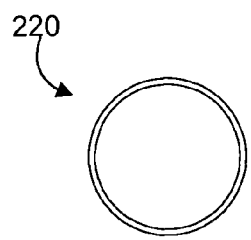
FIG. 11 illustrates a top plan view of a snap ring, according to an embodiment of the present invention.
Figure 12:
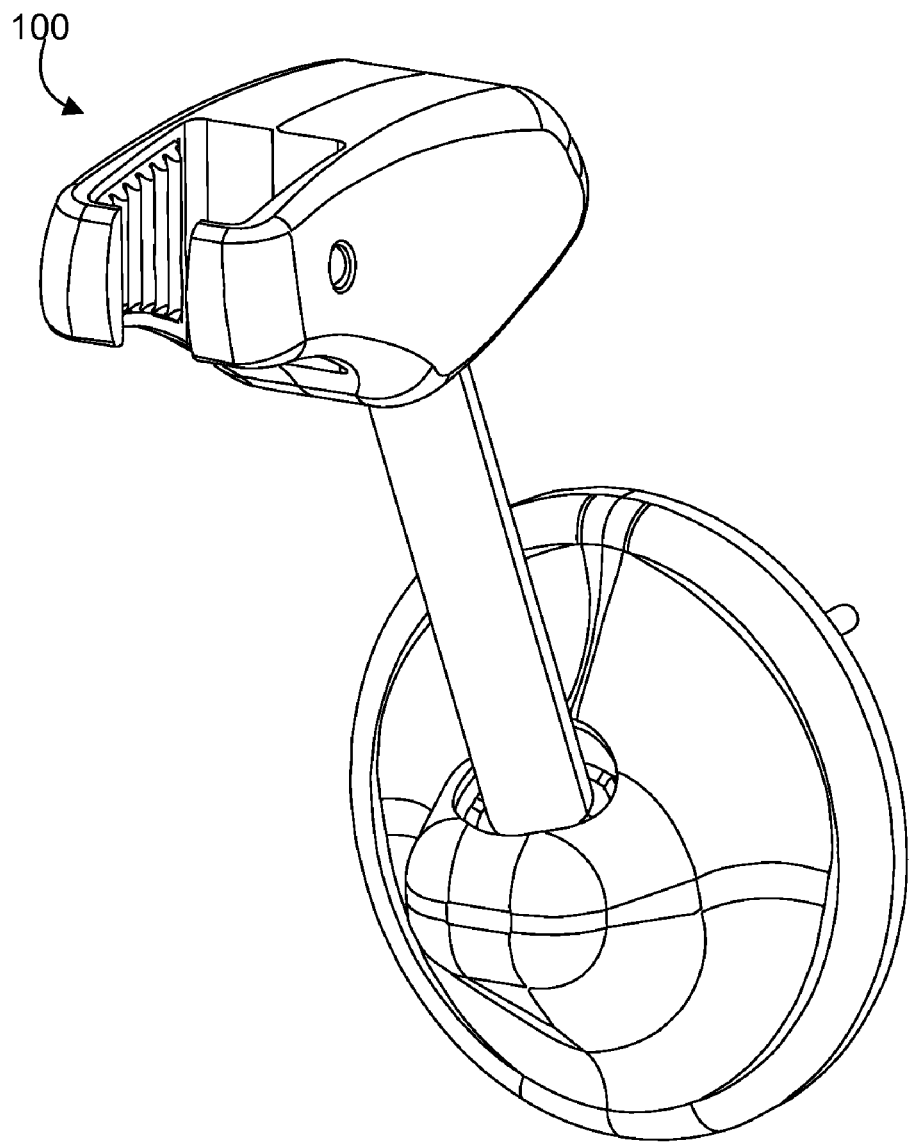
FIG. 12 illustrates a perspective view of a wall mounted blow dryer holder, according to an embodiment of the present invention.
Figure 13:
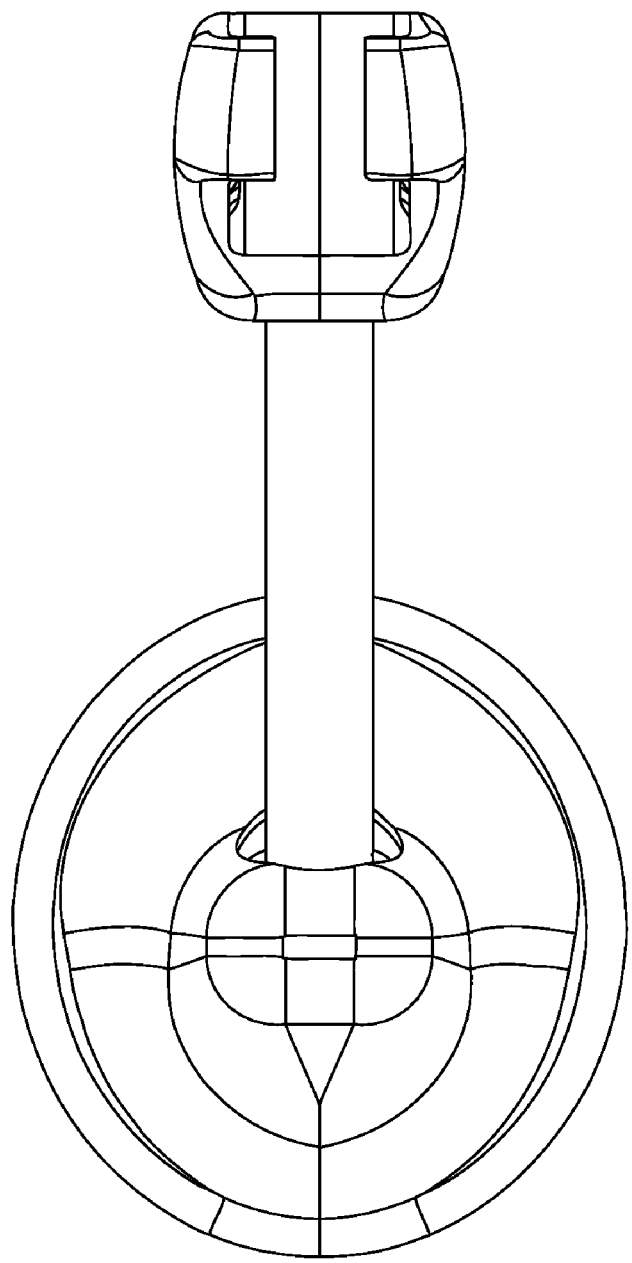
FIG. 13 illustrates a front plan view of a wall mounted blow dryer holder, according to an embodiment of the present invention.
Figure 14:
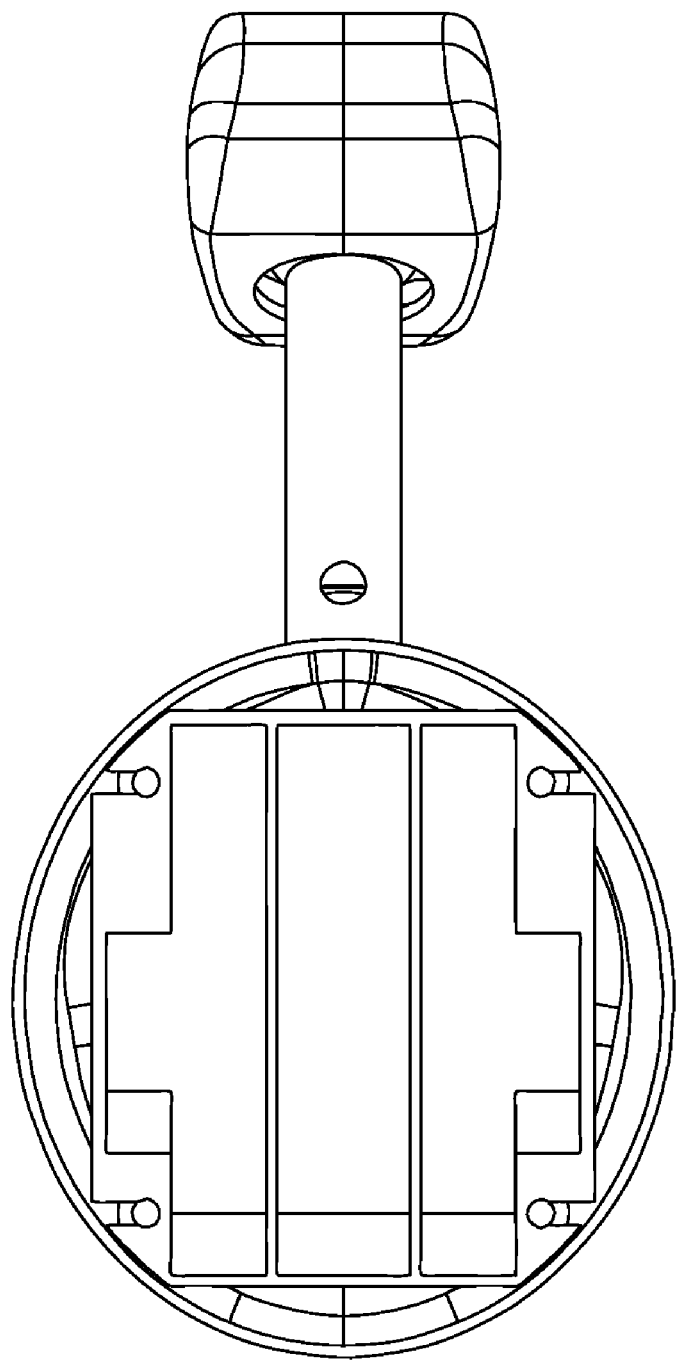
FIG. 14 illustrates a rear plan view of a wall mounted blow dryer holder, according to an embodiment of the present invention.
Figure 15:
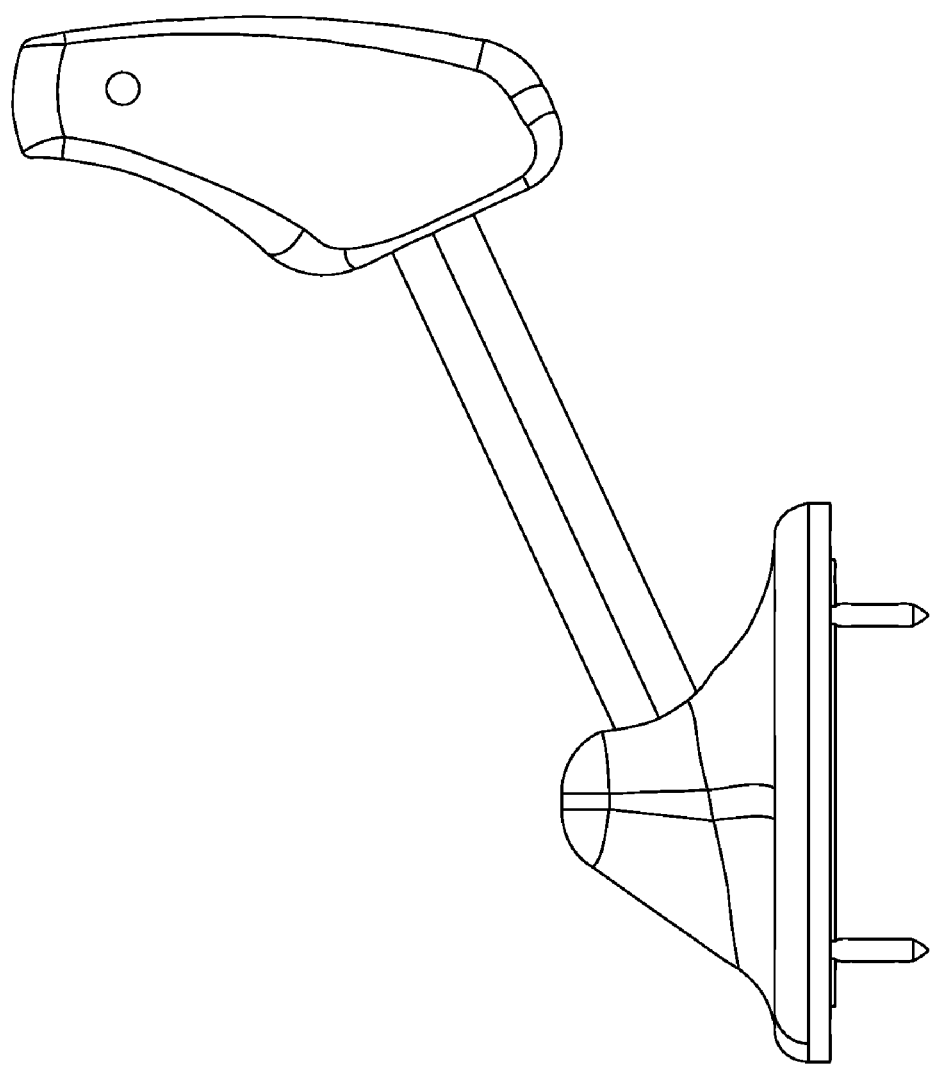
FIG. 15 illustrates a left side plan view of a wall mounted blow dryer holder, according to an embodiment of the present invention.
Figure 16:
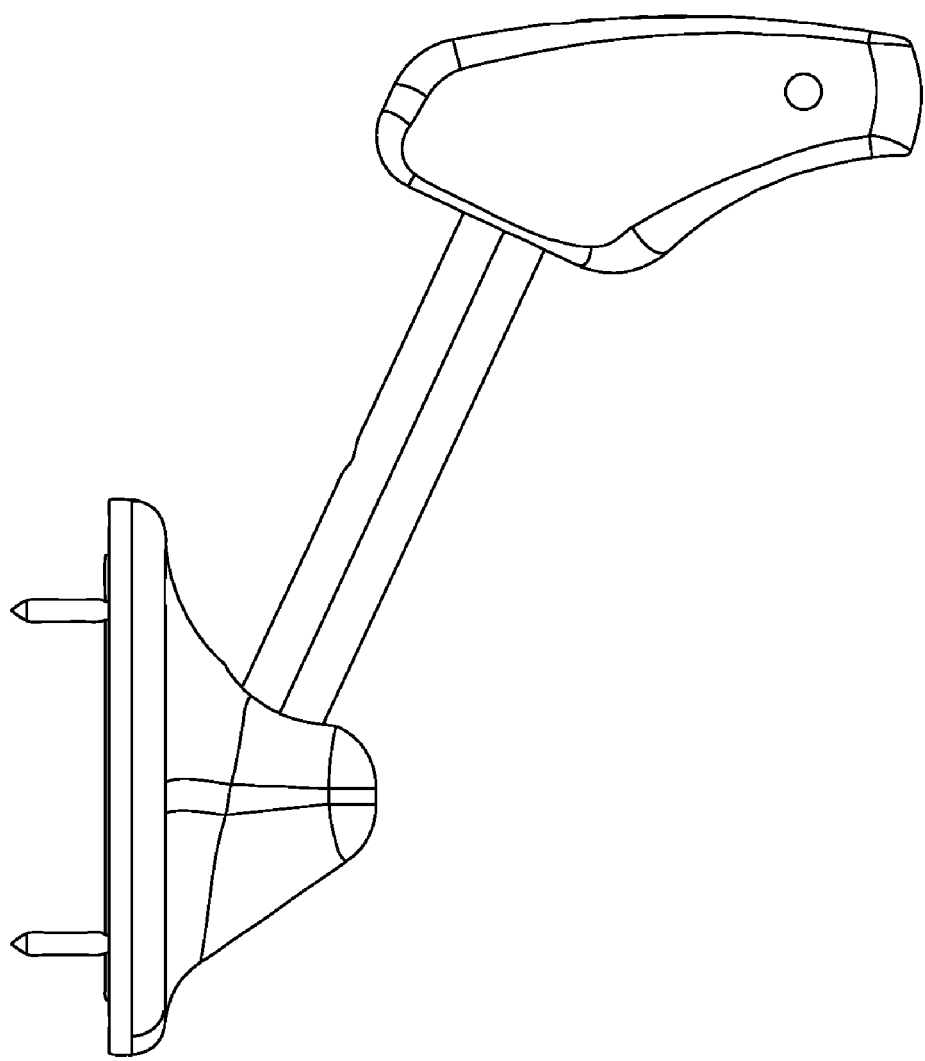
FIG. 16 illustrates a right side plan view of a wall mounted blow dryer holder, according to an embodiment of the present invention.
Figure 17:
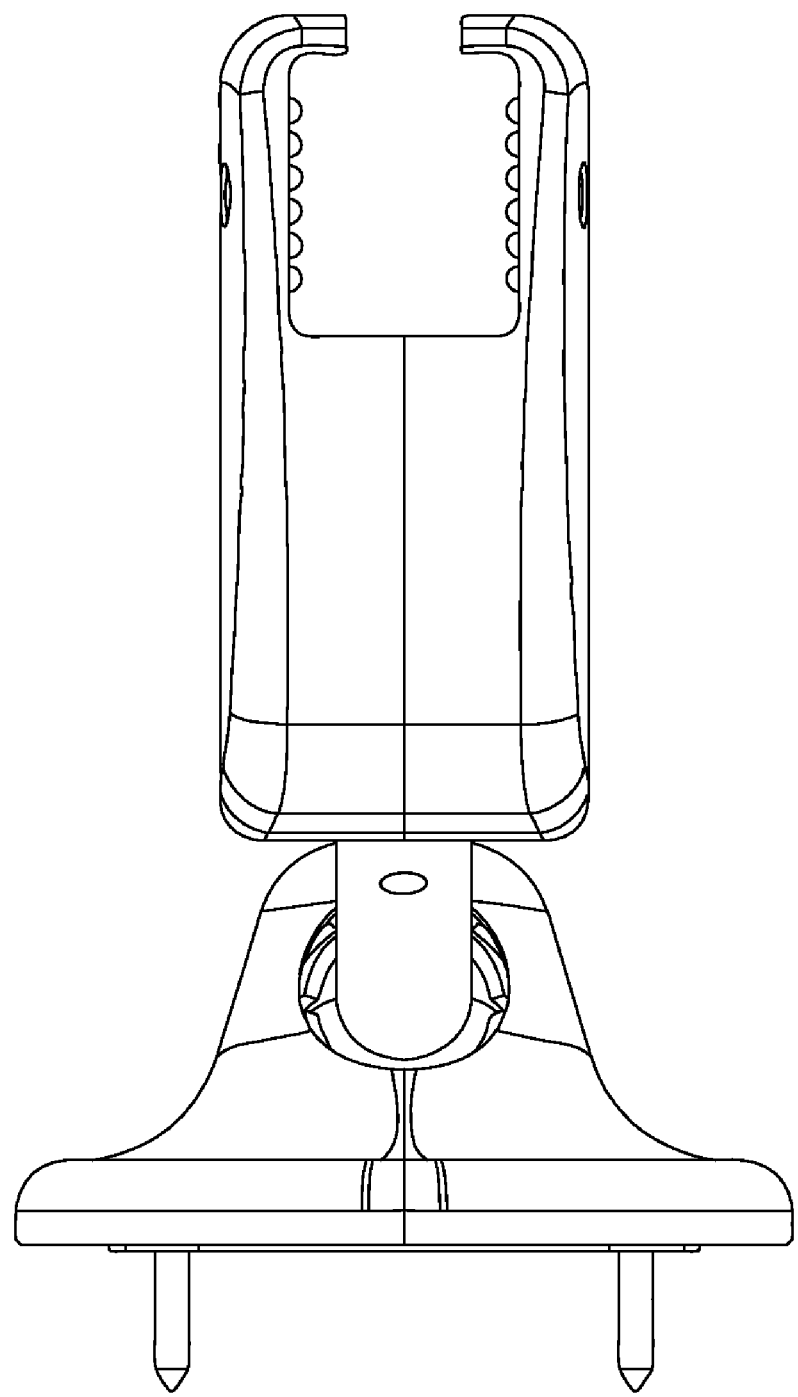
FIG. 17 illustrates a top plan view of a wall mounted blow dryer holder, according to an embodiment of the present invention.
Figure 18:
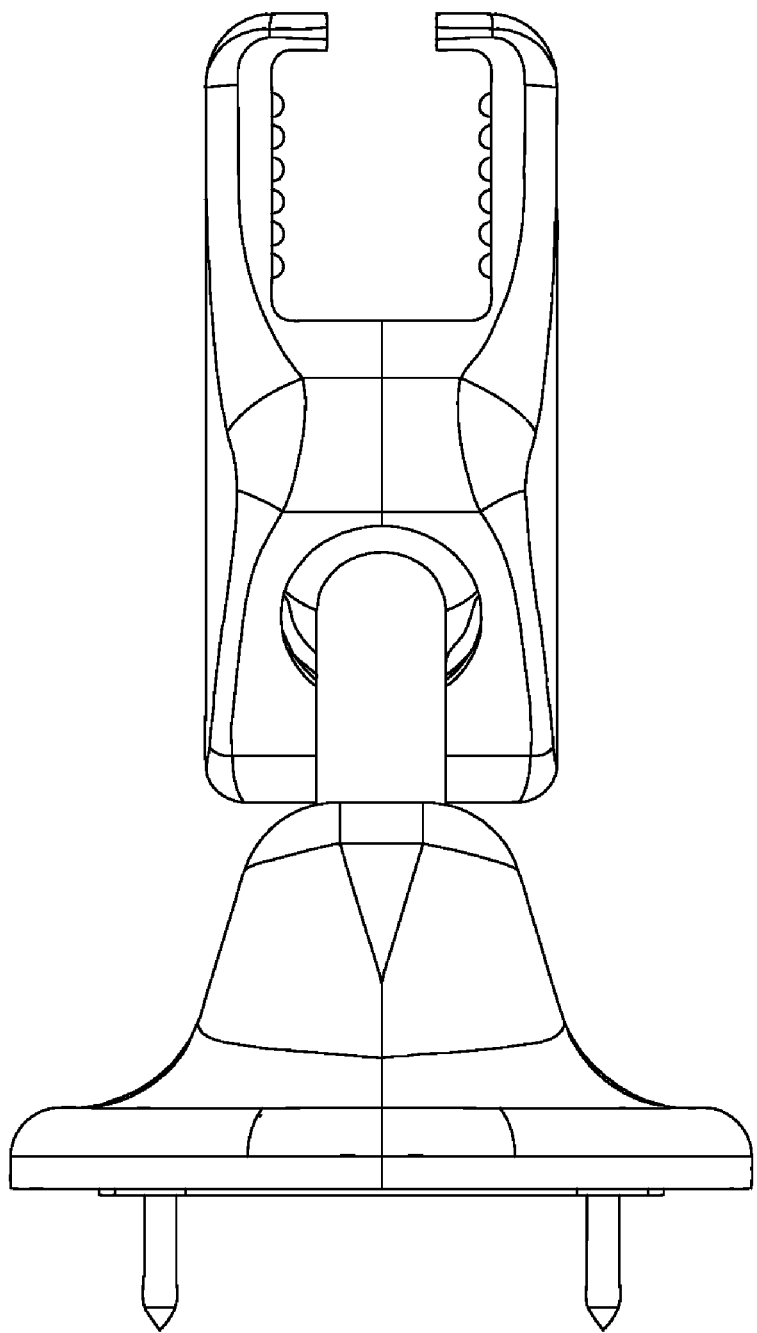
FIG. 18 illustrates a bottom plan view of a wall mounted blow dryer holder, according to an embodiment of the present invention.
Figure 19:
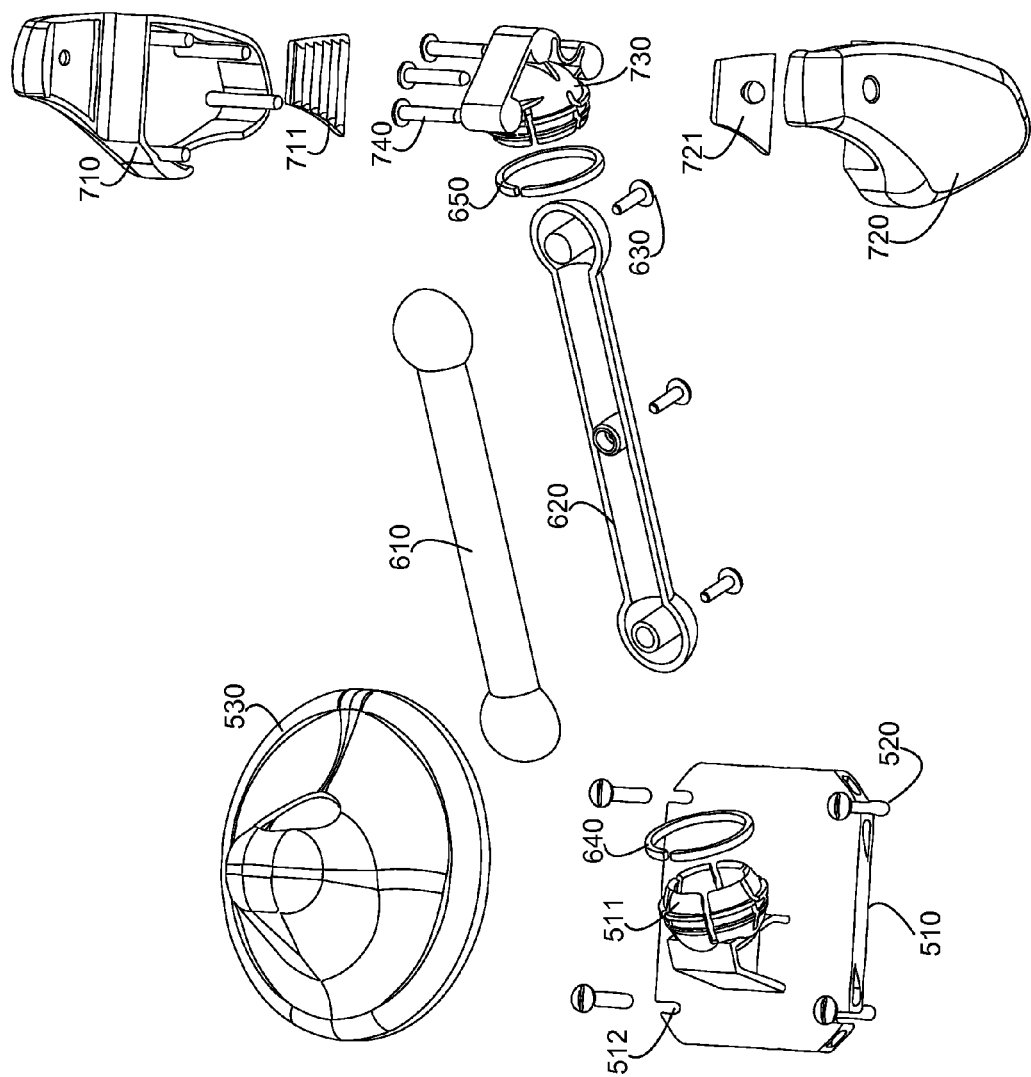
FIG. 19 illustrates an exploded view of a wall mounted blow dryer holder, according to an embodiment of the present invention.
Figure 20:
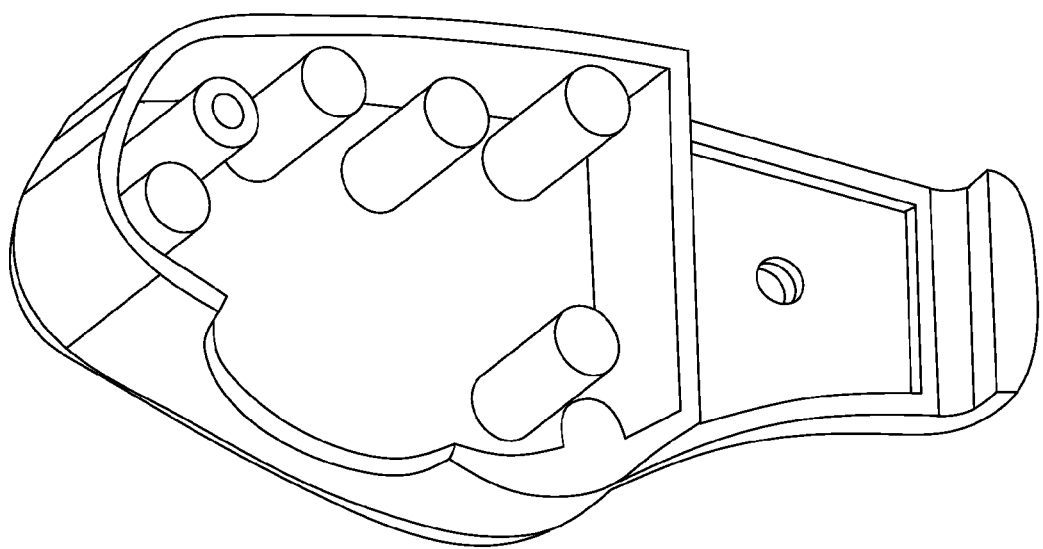
FIG. 20 illustrates a perspective view of a top female element of a wall mounted blow dryer holder, according to an embodiment of the present invention.

The wall mount assembly 200 is further comprised of a wall mount interior assembly 210 and a wall mount exterior assembly 220. The wall mount interior assembly 210 is further comprised of a wall mount interior base 211, and a bottom ball joint holder 212 having a bottom ball joint holder sleeve 213, formed substantially as illustrated in FIG. 5A and FIG. 5B and dimensioned for the insertion of the bottom ball joint 320. At least one of snap ring 340 securely holds bottom ball joint 320 within bottom ball joint holder 212. The wall mount interior base 211 is further comprised of a plurality of interior base fixture hole 214.

The wall mount exterior assembly 220 is comprised of a wall mount exterior base 221, and an exterior encasement 222 having an exterior encasement hole 223 dimensioned for insertion of the bottom ball joint 320 therein. The wall mount exterior assembly 220 is further comprised of a plurality of exterior base fixture hole 224.

The appliance holder assembly 400 is comprised of a U-shaped holder 410, and a plurality of gasket 420. The U-shaped holder 410 is further comprised of a U-shaped cavity 411 on the bottom side of the U-shaped holder. Within the U-shaped cavity 411 is formed a top ball joint holder 412 having a top ball joint holder sleeve 412, dimensioned for the insertion of top ball joint 330. At least one of snap ring 340 securely holds top ball joint 330 within top ball joint holder 412.

In an exemplary embodiment, a wall mounted appliance holder 100 is comprised of a wall mount assembly, a shaft assembly, and an appliance holder assembly.

The wall mount assembly is further comprised of a wall mount base 510 having a lower socket 511 formed on the non-wall side of the wall mount base 510, a plurality of base fastener holes 512, and a plurality of base fasteners 520. The wall mount assembly 500 is further comprised of a bottom cap 530.

The appliance holder assembly is comprised of a male holder 710 having a male gripper insert 711 affixed. The appliance holder assembly is further comprised of a female holder 720 having a female gripper insert 721 affixed. The appliance holder assembly is further comprised of an upper socket 730 and upper socket fasteners 740 that attach the upper socket 730 to the female holder 720. The male holder 710 is formed to mate securely to the female holder 720.

The shaft assembly is comprised of two halves designed to fit together, a male arm 610 and a female arm 620. Arm fasteners 630 connect the male arm 610 with the female arm 620. The shaft assembly is further comprised of a lower snap ring 640 and an upper snap ring 650. The lower snap ring 640 connects the lower portion of the assembled shaft assembly to the lower socket 511. The upper snap ring 650 connects the upper portion of the shaft assembly to the upper socket 730.

From the foregoing, it will be appreciated that, although specific embodiments of the invention have been described herein for purposes of illustration, various modifications may be made without deviating from the spirit and scope of the invention. For example, many of the features and components described above in the context of a particular wall mounted appliance holder configuration can be incorporated into other configurations in accordance with other embodiments of the invention. Accordingly, the invention is not limited except by the appended claims.

What is claimed is:

1. A surface mounted appliance system for holding an appliance comprising:
    a surface mount assembly for attaching to a surface;
    a directional positioning assembly for positioning the appliance; and
    an appliance holding assembly for securely holding an appliance;
    wherein the directional positioning assembly pivotally cooperates with the appliance holding assembly and the wall mount assembly;
    wherein the surface mount assembly is comprised of a bottom cap, a plurality of a wall base fastener and a wall mount base having a wall facing side and a non-wall facing side with a plurality of a base hole disposed therein wherein each base hole is dimensioned to receive one of the wall base fastener, wherein the non-wall facing side has a lower socket disposed formed on the non-wall facing side; and
    wherein the appliance holder assembly is comprised of a male holder, a male holder gripper insert affixed to the male holder, a female holder, a female holder insert affixed to the female holder, an upper socket, a plurality of an upper socket fastener connecting the upper socket to the female holder, wherein the female holder and the male holder are configured to connect to each other.

2. The surface mounted appliance system of claim 1, wherein the directional pivoting assembly is comprised of a lower snap ring, an upper snap ring, a female arm, a male arm, a plurality of an arm fastener joining the female arm to the male arm to form an arm assembly having a shaft section, a lower ball section and an upper ball section, wherein the lower snap ring pivotally joins the lower ball section to the lower socket, wherein the upper snap ring pivotally joins the upper ball section to the upper socket.

3. The surface mounted appliance system of claim 2, wherein the base fastener is a screw.

4. The surface mounted appliance system of claim 3, wherein the upper socket fastener is a screw.

5. The surface mounted appliance system of claim 4, wherein the arm fastener is a screw.

6. The surface mounted appliance system of claim 2, wherein the surface is a substantially vertical wall.

7. The surface mounted appliance system of claim 6, wherein the appliance is a hand-held hair dryer.

8. A device for holding a hand held electric blow dryer, comprising:
   a wall mount assembly;
   a shaft assembly having a near end and a distal end; and
   a U-shaped holder assembly,
   wherein the U-shaped holder assembly is dimensioned for the secure holding of a conventional hand held blow dryer, and the shaft assembly cooperates pivotally with the wall mount assembly and the U-shaped holder assembly to facilitate the positioning of the conventional hand held blow dryer to the angle desired by a user;
   wherein the shaft assembly is further comprised of a shaft element having bottom ball joint at the near end of the shaft element and a top ball joint at the distal end of the shaft element; and
   wherein the wall mount assembly is further comprised of a wall mount interior assembly connected to a wall mount exterior assembly, wherein the wall mount interior assembly is further comprised of a wall mount interior base and a bottom ball joint holder having a bottom ball joint holder sleeve dimensioned for the insertion of the bottom ball joint, at least one of a first snap ring securely holds the bottom ball joint within the bottom ball joint holder, and the wall mount interior base is further comprised of a plurality of interior base fixture hole dimensioned for insertion of a fastener for a vertical surface.

9. The device of claim 8, wherein the wall mount exterior assembly is comprised of a wall mount exterior base and an exterior encasement having an exterior encasement hole dimensioned for insertion of the bottom ball joint therein, and the wall mount exterior assembly is further comprised of a plurality of exterior base fixture hole dimensioned for insertion of a fastener for a vertical surface.

10. The device of claim 9, wherein the U-shaped holder assembly is comprised of a U-shaped holder and a plurality of a gasket, wherein the U-shaped holder has a top side and a bottom side and is further comprised of a U-shaped cavity on the bottom side, a top ball joint holder having a top ball joint holder sleeve is connected within the U-shaped cavity, at least one of a second snap ring securely holds the top ball joint within the top ball joint holder, and the plurality of gasket is releasably attached to the top of the U-shaped holder.

11. A method of making an surface mounted appliance holder, comprising:
   a. creating a rounded base from plastic dimensioned to be fixed to a wall with fasteners;
   b. forming a round holder on the rounded base with cut out edges elevated from the round holder extending upward at approximately 90 degrees;
   c. forming a shaft having a lower ball and an upper ball;
   d. placing the lower ball of the shaft in the rounded base;
   e. securing the lower ball of the shaft with a spring steel snap ring around the cut out edges;
   f. taking a holder with a rounded out hollow base with cut out edges and placing the holder over the upper ball;
   g. securing the holder to the upper ball with a spring steel snap ring around the cut out edges of the holder;
   h. forming gaskets dimensioned to fit on the holder and having sufficient friction holding characteristics to snugly hold a blow dryer in place;
   i. pressing the rubber gaskets onto the holder; and
   j. checking a tension and holding power of the assembly.

* * * * *